L. Miller.
Harvester Cutter.
No. 777.
Reissued. July. 19. 1859.
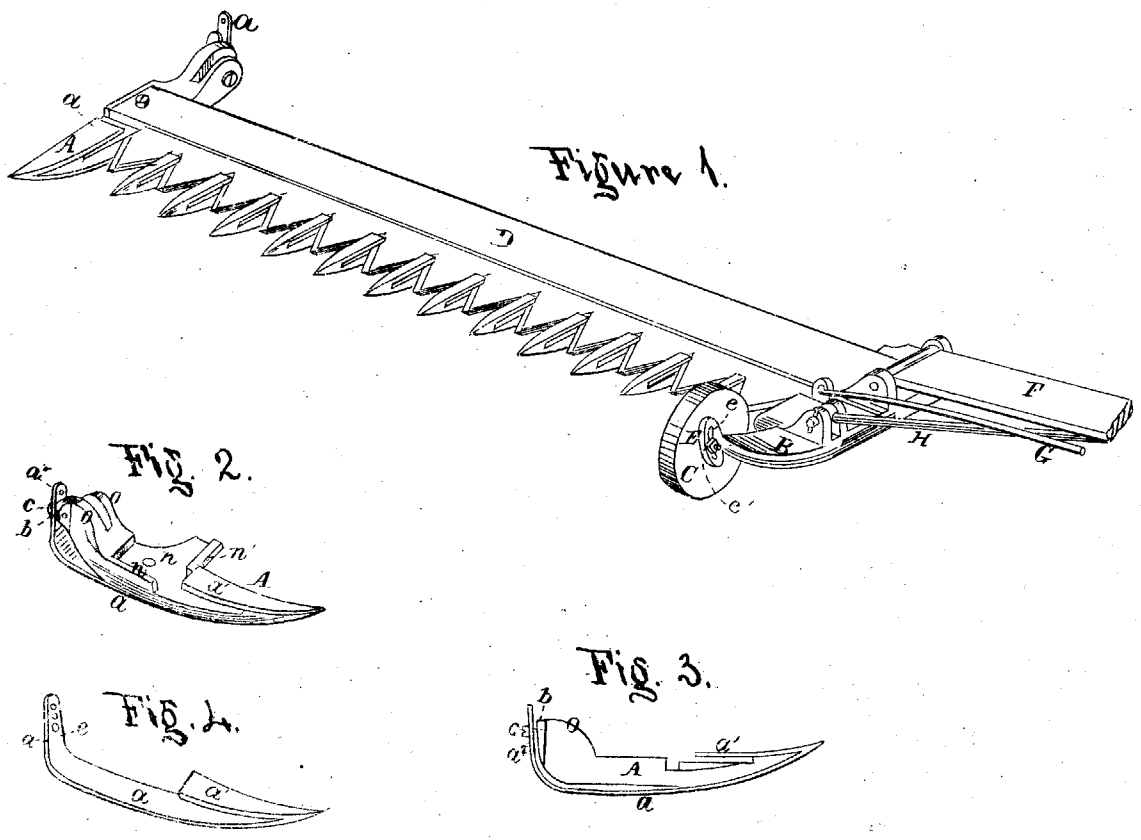

UNITED STATES PATENT OFFICE.

LEWIS MILLER, OF CANTON, OHIO, ASSIGNOR TO C. AULTMAN & CO.

IMPROVEMENT IN HARVESTERS.

Specification forming part of Letters Patent No. 20,181, dated May 4, 1858; Reissue No. 777, dated July 19, 1859.

DIVISION A[3].

*To all whom it may concern:*

Be it known that I, LEWIS MILLER, of Canton, in the county of Stark and State of Ohio, have invented certain new and useful Improvements in Harvesting-Machines, of which the following is a full, clear, and exact description, reference being had to the accompanying drawings, which make part of this specification, and in which—

Figure 1 represents in perspective certain parts of a machine for mowing embracing my improvements. Fig. 2 represents in perspective the right or out side shoe with its adjustable sole. Fig. 3 represents an elevation of the right side of the same, and Fig. 4 represents in perspective the sole of the same detached.

That end of the finger-beam which is connected to the main frame by the coupling-arm is called the "left" or "inner" end and the opposite end is called the "right" or "outer" end.

In the use of mowing-machines it has been found that to allow the under side of the finger-beam and of the guard-fingers to slide in immediate contact with the ground involves too much friction and too much wear and tear. To remedy this defect shoes shaped like sled-runners have been placed at the ends of the finger-beam to carry it very near to but not in connection with the ground; but this contrivance, though lessening, has not obviated the difficulty, as the friction between the shoes and the ground is very great, especially at the inner end of the finger-beam, and a wheel or roller has been placed at the rear and at the end of the finger-beam to relieve this excessive friction; but such wheels so arranged have not worked satisfactorily, as they either lift the finger-beam the cutter too far from the ground or else prevent them from conforming with the requisite freedom to the undulations of the ground. Moreover, the cut grass lying loosely in the path of the shoe is liable to be pushed forward when the shoe runs close to the ground until a mass accumulates that will either clog and stop the machine or raise the cutter above the grass and make a balk in the cutting.

To avoid the defects while retaining the advantages of previous shoes without and those with the supporting-wheel is the object of my said invention, which consists in arranging a supporting-wheel in front of the finger-beam and shoe instead of in the rear or at the end of the finger-beam, under which new arrangement the wheel leads the shoe and treads down the loose grass in its path, thereby preventing the grass from being pushed forward in a roll or bunch and clogging the machine, while at the same time the finger-beam and shoe behind the leading-wheel are left sufficiently free to conform to the undulations of the ground and the friction and draft of the shoe greatly diminished.

In the accompanying drawings, A is the outer and B the inner shoe.

C is the leading and tread wheel, which runs before the cutter, and also in advance of and in the path to be followed by the sole of the shoe. The mode of keeping the wheel in its proper place which I deem preferable is to mount it on a pivot held by a clamp-screw, *e'*, in a slot, *e*, in a cross-bar, E, at the point of the shoe B.

The finger-beam D is of the usual construction, and is firmly connected to the shoe by means of a seat which fits its end and by screw-bolts.

The shoe is jointed to the coupling-arm F and the cutter is jointed to a connecting-rod, G, while the brace H strengthens the connection of the shoe to the hinged coupling-arm.

What I claim under this patent as my invention is—

The combination of the inner shoe with a leading-wheel arranged substantially as herein set forth.

In testimony whereof I have hereunto subscribed my name.

LEWIS MILLER.

Witnesses:
S. MANKER,
DANL. TONNER.